(12) United States Patent
Lee

(10) Patent No.: US 10,999,525 B2
(45) Date of Patent: May 4, 2021

(54) IMAGE PROCESSING APPARATUS AND METHOD FOR COMPRESSING DYNAMIC RANGE OF WDR IMAGE

(71) Applicant: HANWHA TECHWIN CO., LTD., Seongnam-si (KR)

(72) Inventor: Chang Min Lee, Seongnam-si (KR)

(73) Assignee: HANWHA TECHWIN CO., LTD., Seongnam-si (KR)

( * ) Notice: Subject to any disclaimer, the term of this patent is extended or adjusted under 35 U.S.C. 154(b) by 89 days.

(21) Appl. No.: 16/393,102

(22) Filed: Apr. 24, 2019

(65) Prior Publication Data

US 2019/0253602 A1 Aug. 15, 2019

Related U.S. Application Data

(63) Continuation of application No. PCT/KR2016/012159, filed on Oct. 27, 2016.

(30) Foreign Application Priority Data

Oct. 25, 2016 (KR) .......................... 10-2016-0139160

(51) Int. Cl.
*H04N 5/225* (2006.01)
*H04N 5/235* (2006.01)
(Continued)

(52) U.S. Cl.
CPC ............. *H04N 5/2355* (2013.01); *G06T 5/00* (2013.01); *G06T 5/40* (2013.01); *G06T 5/50* (2013.01);
(Continued)

(58) Field of Classification Search
None
See application file for complete search history.

(56) References Cited

U.S. PATENT DOCUMENTS

| 2007/0097240 A1* | 5/2007 | Egawa | H04N 5/335 348/308 |
| 2007/0103562 A1* | 5/2007 | Kaneko | H04N 5/23248 348/222.1 |

(Continued)

FOREIGN PATENT DOCUMENTS

| JP | 2007-310887 A | 11/2007 |
| JP | 2009-296178 A | 12/2009 |

(Continued)

OTHER PUBLICATIONS

S. Cvetkovic et al., "Tone-Mapping Functions and Multiple-Exposure Techniques for High Dynamic-Range Images", IEEE Transactions on Consumer Electronics, vol. 54, No. 2, IEEE Service Center, New York, NY, XP011229982, May 1, 2008, pp. 904-911.

(Continued)

*Primary Examiner* — Twyler L Haskins
*Assistant Examiner* — Dwight Alex C Tejano
(74) *Attorney, Agent, or Firm* — Sughrue Mion, PLLC

(57) ABSTRACT

Provided is an image processing apparatus including: a wide dynamic range (WDR) image sensor configured to output image frames by photographing a subject with different shutter times; and at least one processor to implement: a wide image synthesis unit configured to synthesize a WDR image based on n subchannels included in each of the image frames; a knee curve generating unit configured to generate an integral histogram of luminance levels of m×n subchannels included m image frames among the image frames, and generate a knee curve based on the integral histogram, where m and n each is an integer greater than zero; and a dynamic range transforming unit configured to reduce a dynamic range of the WDR image based on the generated knee curve.

19 Claims, 15 Drawing Sheets
(4 of 15 Drawing Sheet(s) Filed in Color)

(51) Int. Cl.
  *H04N 5/355* (2011.01)
  *G06T 5/50* (2006.01)
  *G06T 5/40* (2006.01)
  *G06T 5/00* (2006.01)
  *H04N 5/335* (2011.01)

(52) U.S. Cl.
  CPC ............. *H04N 5/335* (2013.01); *H04N 5/355* (2013.01); *H04N 5/35527* (2013.01); *G06T 2207/20208* (2013.01)

(56) References Cited

U.S. PATENT DOCUMENTS

| | | | | |
|---|---|---|---|---|
| 2007/0229699 | A1* | 10/2007 | Hamamura | H04N 5/235 348/362 |
| 2009/0161953 | A1 | 6/2009 | Ciurea et al. | |
| 2009/0295941 | A1* | 12/2009 | Nakajima | G06T 5/40 348/229.1 |
| 2009/0316031 | A1* | 12/2009 | Wakamori | H04N 5/35581 348/308 |
| 2010/0165163 | A1* | 7/2010 | Matsuda | H04N 5/35572 348/302 |
| 2011/0069200 | A1* | 3/2011 | Oh | H04N 5/2355 348/229.1 |
| 2011/0134298 | A1* | 6/2011 | Aoyama | H01L 27/14609 348/311 |
| 2012/0218426 | A1* | 8/2012 | Kaizu | H04N 5/35554 348/208.4 |
| 2014/0341468 | A1 | 11/2014 | Paris et al. | |

FOREIGN PATENT DOCUMENTS

| | | |
|---|---|---|
| JP | 2014-23062 A | 2/2014 |
| KR | 10-2013-0034186 A | 4/2013 |
| KR | 10-2014-0133394 A | 11/2014 |
| WO | 2016/038775 A1 | 3/2016 |

OTHER PUBLICATIONS

Ronan Boitard et al., "Temporal Coherency in Video Tone Mapping, a Survey", First International Conference and SME Workshop on HDR imaging, XP055469400, Jan. 1, 2013, pp. 1-6.
Communication dated May 12, 2020, issued by the European Patent Office in counterpart European Application No. 16919835.5.
International Search Report dated Jul. 24, 2017 by the International Searching Authority in counterpart International Patent Application No. PCT/KR2016/012159. (PCT/ISA/210).
Written Opinion dated Jul. 24, 2017 by the International Searching Authority in counterpart International Patent Application No. PCT/KR2016/012159. (PCT/ISA/237).

* cited by examiner

IMAGE PROCESSING APPARATUS AND METHOD FOR COMPRESSING DYNAMIC RANGE OF WDR IMAGE

CROSS-REFERENCE TO THE RELATED APPLICATION

This application is a Continuation of International Patent Application No. PCT/KR2016/012159, filed on Oct. 27, 2016, and claims priority from Korean Patent Application No. 10-2016-0139160, filed on Oct. 25, 2016, the disclosure of which is hereby incorporated by reference in its entirety.

BACKGROUND

Methods and apparatuses consistent with exemplary embodiments relate to an image processing apparatus, and more particularly, to an apparatus and a method for generating an image having a wide dynamic range (WDR) from a WDR image sensor.

Information disclosed in this Background section has already been known to the inventors before achieving the disclosure of the present application or is technical information acquired in the process of achieving the disclosure. Therefore, it may contain information that does not form the prior art that is already known to the public.

A solid-state image pickup device such as a charge-coupled device (CCD) image sensor or a complementary metal-oxide semiconductor (CMOS) image sensor used in a video camera, a digital camera, or the like performs photoelectric conversion by accumulating charges corresponding to the amount of incident light and outputting an electric signal corresponding to the accumulated charges. However, there is an upper limit in a charge accumulation amount of a photoelectric conversion device, so when a light amount of a predetermined level or more is received such that the accumulated charge amount reaches a saturation level, so-called white noise phenomenon occurs in which a subject area with more than a certain brightness level is set to a saturated luminance level.

In order to prevent such a phenomenon, an exposure time may be shortened by dividing a shutter at a high speed for a bright subject to shorten a charge accumulation period of the photoelectric conversion device, and an electric signal is output before the accumulated charge amount reaches the saturation level. By this processing, it is possible to output an image in which a gradation corresponding to a subject is accurately reproduced. However, in the case of photographing a subject with a mixture of light and dark areas, if the shutter is divided at the high speed, a sufficient exposure time cannot be obtained in the dark area, deteriorating a signal-to-noise ratio (SNR) and an image quality.

In order to accurately reproduce a luminance level of the bright area and the dark area in the photographed image of a subject in which both the light area and the dark area are mixed, a different approach is required so that a high SNR can be obtained in a pixel with small incident light by applying a long exposure time while avoiding saturation in a pixel with large incident light.

Such approach may be implemented by photographing and synthesizing a plurality of images having different exposure times. According to a wide dynamic range (WDR) technology, an image is synthesized using a short-time exposure image and a long-time exposure image. The short-time exposure image is used for the bright image area, and the long-time exposure image is used for the dark area.

A wide dynamic range (WDR) image may be acquired in various photographing environments by the WDR technology. For example, when photographing in a room where a backlight is provided by a window, when photographing a night view where light areas and a dark areas are mixed, or when photographing at a sporting event where sunlight and shade create light and dark areas.

FIG. 1 illustrates an example of a general WDR frame generation technology.

Here, one WDR frame (i.e., WDR image) is synthesized using four subchannels in an image sensor supporting 120 frames per second (fps). Even though an original subchannel supports 120 fps, since four subchannels are synchronized into one WDR frame, only up to 30 fps is actually allowed. In this case, four subchannels are photographed at different shutter times (exposure times) of very long (VL), long (L), short (S), and very short (VS), respectively. As described above, four subchannels have different luminance due to the different shutter times.

However, since such a WDR frame has a wider dynamic range than each subchannel, it is necessary to reduce (i.e., compress) the dynamic range for output from a display device (e.g., a display device, an image display terminal, etc.) having a limited dynamic range.

For example, assuming that a dynamic range of each subchannel is 12 bits and a dynamic range of the display device is also 12 bits, the dynamic range of the WDR frame acquired by synthesizing four subchannels significantly increases to 23 to 24 bits according to a gain and an overlap range of each subchannel. Thus, it is necessary to compress the increased dynamic range back to 12 bits.

When a fixed knee curve is used for the subchannels in the dynamic range compression, unique characteristics of each subchannel may not be correctly reflected in the WDR frame. On the contrary, even if the knee curve is generated based on scene analysis, image artifacts may arise when compression transformation is performed sensitively according to a change of a scene.

Therefore, in a multi-channel-based WDR frame technology, it is necessary to compress the dynamic range on the basis of the scene but correctly reflect characteristics of each subchannel.

SUMMARY

The Exemplary embodiments provide an apparatus and a method for image processing, which can correctly reflect characteristics of respective subchannels in dynamic range compression of a multi-channel based WDR frame.

The Exemplary embodiments also provide an apparatus and a method for image processing, which comprehensively consider a distribution of a designated area and a saturated area of each subchannel in the dynamic range compression of the multi-channel based WDR frame.

However, technical objects of the present disclosure are not restricted to the technical object mentioned as above. Unmentioned technical objects will be apparently appreciated by those skilled in the art by referencing the following description.

According to an aspect of an exemplary embodiment, there is provided an image processing apparatus including: a wide dynamic range (WDR) image sensor configured to output image frames by photographing a subject with different shutter times; and at least one processor to implement: a wide image synthesis unit configured to synthesize a WDR image based on n subchannels included in each of the image frames; a knee curve generating unit configured to generate an integral histogram of luminance levels of m×n subchannels included m image frames among the image frames, and generate a knee curve based on the integral histogram, where m and n each is an integer greater than zero; and a dynamic range transforming unit configured to reduce a dynamic range of the WDR image based on the generated knee curve.

Each of m and n may be 4, and n subchannels may be very long (VL), long (L), short (S), and very short (VS) channels.

The knee curve generating unit may include: an area dividing unit configured to detect a designated area including non-saturated pixels from each of the m×n subchannels, a designated area processing unit configured to set an extraction area in the designated area by setting a lower threshold luminance value and an upper threshold luminance value, and count a number of pixels included in the extraction area, and a histogram calculating unit configured to calculate a unit histogram for each of the m×n subchannels based on the counted number of pixels, and generate the integral histogram by combining unit histograms for the m×n subchannels.

The designated area processing unit may be further configured to set extraction areas not to overlap among subchannels which belong to different image frames and have a same shutter time.

The histogram calculating unit may be further configured to count the number of pixels included in each of the extraction areas and generate the integral histogram by arranging counted numbers corresponding to the m×n subchannels.

The knee curve generating unit may further include a preprocessing unit configured to normalize the integral histogram and apply a weight for each interval to the normalized integral histogram.

The preprocessing unit may be further configured to apply a relatively high weight to an interval having a lowest luminance level and an interval having a highest luminance level in the normalized integral histogram.

The area dividing unit may be further configured to detect a saturated area from each of the m×n subchannels in addition to the designated area, and The knee curve generating unit may further include a saturated area processing unit configured to count a number of pixels included in the saturated area.

The knee curve generating unit may further include a maximum level sensing unit configured to sense a maximum level value by comparing the number of pixels included in the saturated area and a maximum threshold value predetermined for each subchannel, in ascending order of a shutter time applied to each subchannel.

When the number of pixels included in the saturated area of a current subchannel does not exceed a maximum threshold value for the current subchannel, the maximum level sensing unit may set a gain value of the current subchannel as the maximum level value, and a knee curve generating unit may be further configured to generates the knee curve based on the maximum level value.

According to an aspect of an exemplary embodiment, there is provided a wide dynamic range (WDR) image processing method including: generating image frames by photographing a subject with different shutter times; setting an extraction area having a lower threshold luminance value and an upper threshold luminance value with respect to each of m×n subchannels included in m image frames among the image frames, each image frame having n subchannels; counting a number of pixels included in the extraction area; calculating a unit histogram for each of the m×n subchannels based on the counted number of pixels; generating an integral histogram by combining unit histograms corresponding to the m×n subchannels; generating a knee curve based on the generated integral histogram; synthesizing a WDR image by synthesizing the n subchannels for each of the image frames; and reducing a dynamic range of the synthesized WDR image based on the generated knee curve.

The setting of the extraction area may include setting extraction areas not to overlap among subchannels which belong to different image frames and have a same shutter time.

The extraction areas may belong to m consecutive image frames, respectively.

The generating of the integral histogram may include counting a number of pixels included in the extraction area, and generating the integral histogram by arranging counted numbers corresponding to the m×n subchannels.

The generating of the knee curve may include normalizing the generated integral histogram and applying a weight for each interval to the normalized integral histogram.

According to an aspect of an exemplary embodiment, there is provided a wide dynamic range (WDR) image processing method including: outputting image frames by photographing a subject with different shutter times; synthesizing a WDR image based on n subchannels included in each of the image frames; calculating a unit histogram based on a luminance level with respect to each of m×n subchannels included in m image frames among the image frames; generating an integral histogram by combining the generated unit histograms; and reducing a dynamic range of the WDR image based on the integral histogram.

Each of m and n may be 4, and the n subchannels may be very long (VL), long (L), short (S), and very short (VS) channels.

The generating of the integral histogram may include: dividing each of the m×n subchannels into a designated area including non-saturated pixels and a saturated area including saturated pixels; setting an extraction area by setting a lower threshold luminance value and an upper threshold luminance value within the designated area; counting a number of pixels included in the extraction area; calculating a unit histogram for each of the m×n subchannels based on the counted number of pixels; and combining unit histograms calculated for the m×n subchannels.

The reducing of the dynamic range of the WDR image may include: calculating a knee curve based on the integral histogram and a number of saturated pixels included in each of the m×n subchannels; and transforming the integral histogram based on the knee curve.

A slope for each interval of the knee curve may be determined using a gamma curve.

When a first interval immediately preceding a second interval in the integral histogram has fewer pixels than the second interval, the second interval may have a greater slope than the first interval in the knee curve.

In an apparatus and a method for dynamic range compression according to the exemplary embodiments, a dynamic range of a WDR frame can be compressed adaptively according to an environment in which an image is photographed to reduce deterioration of an image quality.

Further, in compression of the dynamic range of the WDR frame, since an image characteristic of each of subchannels for synthesizing the WDR frame is comprehensively reflected, a WDR frame can be provided, which is visually very natural to a user.

BRIEF DESCRIPTION OF THE DRAWINGS

The application file contains at least one drawing executed in color. Copies of this application publication with the color drawings will be provided by the Office upon request and payment of the necessary fee.

DETAILED DESCRIPTION OF THE EXEMPLARY EMBODIMENTS

Figure 1:
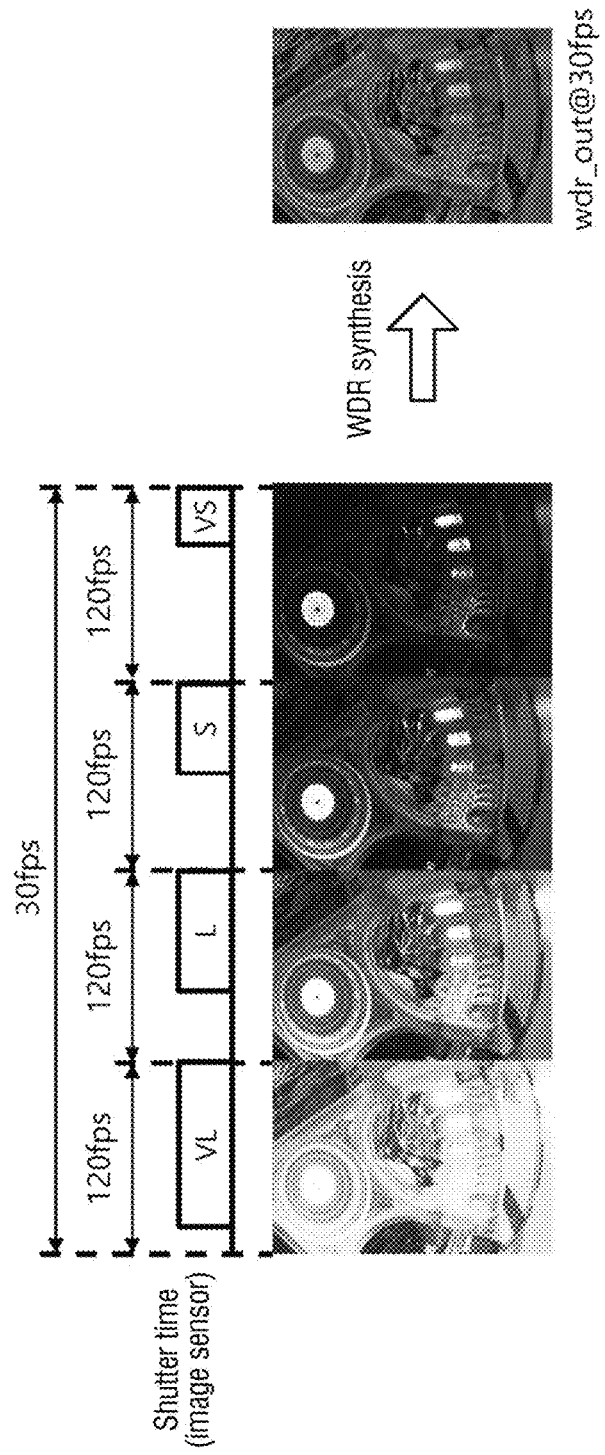
FIG. 1 illustrates an example of a general WDR frame generation technology.

These exemplary embodiments will be described in detail in order to allow those skilled in the art to practice the inventive concept. It should be appreciated that various exemplary embodiments are different, but are not necessarily exclusive. For example, specific shapes, configurations, and characteristics described in an exemplary embodiment may be implemented in another exemplary embodiment without departing from the spirit and the scope of the inventive concept. In addition, it should be understood that positions and arrangements of individual components in each disclosed exemplary embodiment may be changed without departing from the spirit and the scope of the inventive concept. Therefore, the detailed description provided below should not be construed as being restrictive. In addition, the inventive concept is defined only by the accompanying claims and their equivalents if appropriate. Like reference numerals refer to like elements throughout the specification.

Hereinafter, the exemplary embodiments will be described in detail with reference to the accompanying drawings.

Figure 2:
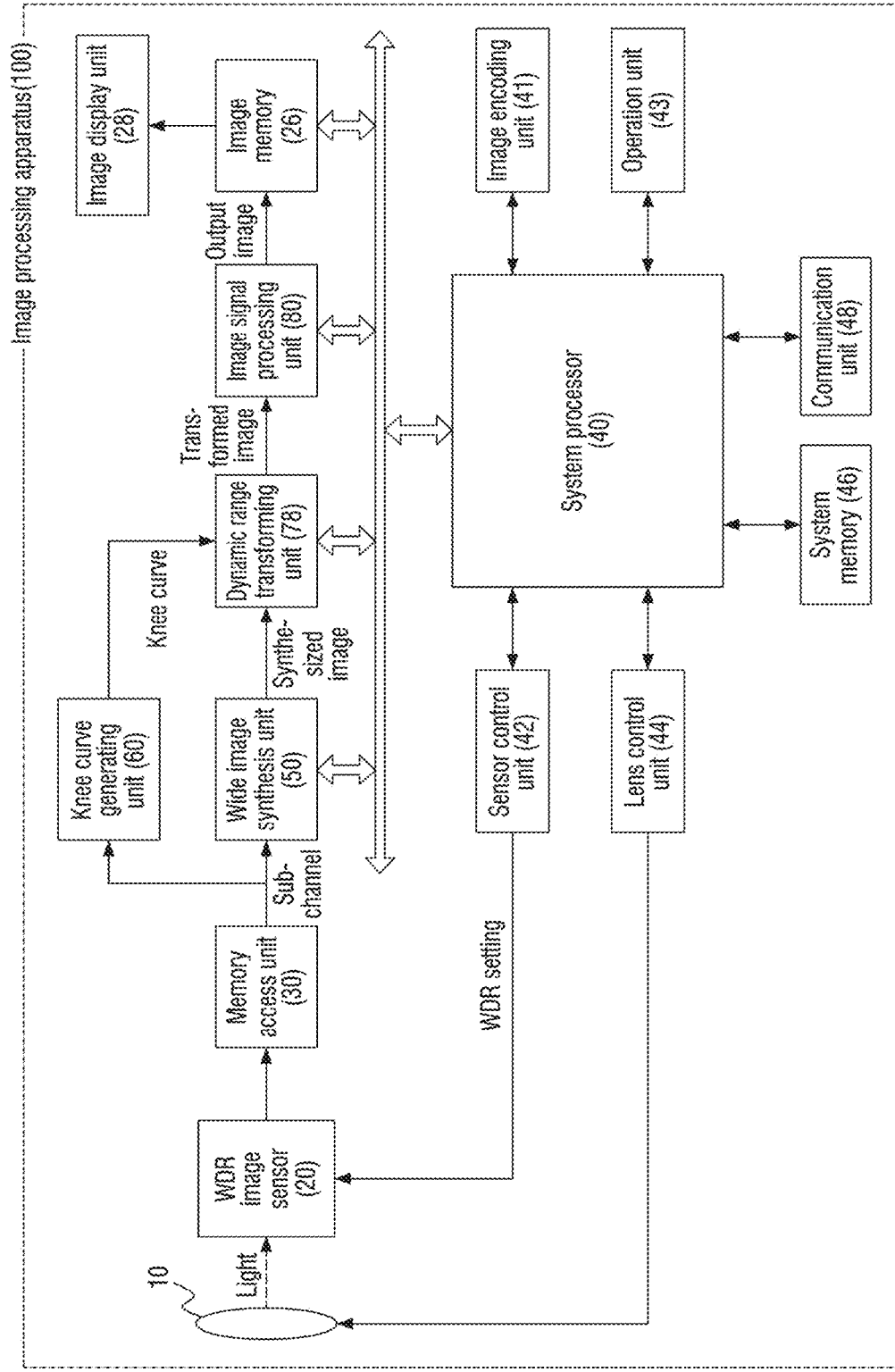
FIG. 2 is a block diagram illustrating an image processing apparatus according to an exemplary embodiment.

FIG. 2 is a block diagram illustrating an image processing apparatus 100 according to an exemplary embodiment.

Reflected light emitted from a subject is guided to a WDR image sensor 20 through a photographing lens 10 and converted into image data (i.e., electrical signal) in the WDR image sensor 20. The WDR image sensor 20 may be implemented as a solid-state image sensor such as a charge coupled device (CCD) or a complementary metal-oxide semiconductor (CMOS). The WDR image sensor 20 may be a color compliant sensor in which three color filters of red (R), green (G), and blue (B) are Bayer-arrayed. In an exemplary embodiment, in pixel data, a pixel string output in the order of R, G, R, G . . . and another pixel string output in the order of B, G, B, G . . . may be output alternately. However, the order of colors to be output may be changed according to an array of the color filters of the WDR image sensor 120.

In addition, the WDR image sensor 20 supports a WDR function and provides respective corresponding subchannels (e.g., there are four subchannels in FIG. 1) through a plurality of image channels (i.e., image output channels). The subchannels represent images generated under different photographing conditions and used as basic images for synthesizing one WDR frame.

The number of subchannels for synthesizing one WDR frame may vary according to a WDR mode, which may be changed by a sensor control unit 42. For example, the sensor control unit 42 may control the WDR image sensor 20 to select any one of a normal mode (i.e., WDR disabled), a 2 WDR mode and a 4 WDR mode. Also, the sensor control unit 42 may control the WDR image sensor 20 to change from the currently selected WDR mode to another WDR mode according to the characteristics of the scene.

A memory access unit 30 may sequentially accumulate a Bayer pixel string provided from the WDR image sensor 20 to constitute subchannels, for example, four subchannels of very long (VL), long (L), short (S), and very short (VS). The memory access unit 30 may provide the subchannels to a wide image synthesis unit 50 and the knee curve generating unit 60.

Figure 3:
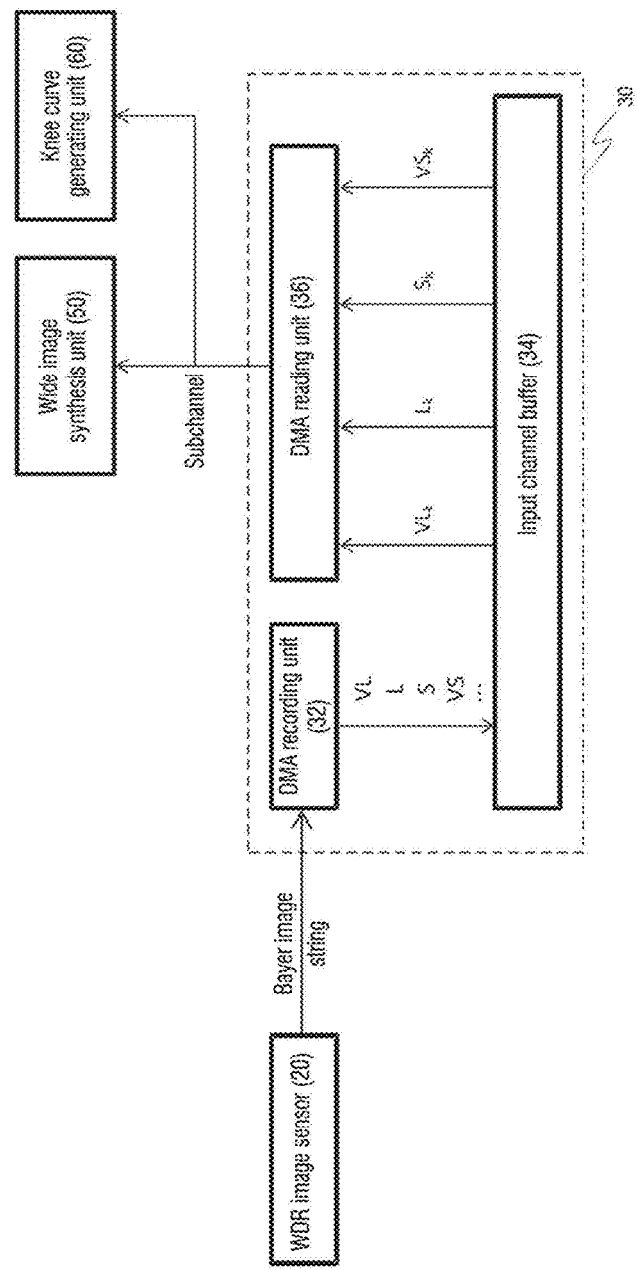
FIG. 3 is a block diagram illustrating a configuration of a memory access unit according to an exemplary embodiment.

FIG. 3 is a block diagram illustrating a configuration of a memory access unit 30, according to an exemplary embodiment.

First, the Bayer pixel string output from the WDR image sensor 20 is accumulated in a direct memory access (DMA) recording unit 32 of the memory access unit 30 in sequence. The accumulated pixels are constituted by respective subchannels and stored in an input channel buffer 34. The input channel buffer 34 outputs subchannels VLk, Lk, Sk, and VSk, which have different shutter times and belong to a k-th frame, to the DMA reading unit 36 according to the WDR mode. The DMA reading unit 36 provides the subchannels in response to a request from the wide image synthesis unit 50 or the knee curve generating unit 60.

Referring back to FIG. 2, the wide image synthesis unit 50 uses n subchannels included in an image frame (i.e., WDR frame) output from the WDR image sensor 20 to synthesize wide dynamic range frames. The natural number n may be a power of 2. A specific operation performed by the wide image synthesis unit 50 will be described below with reference to FIG. 4.

The knee curve generating unit 60 may generate unit histograms from luminance levels of m×n subchannels of m image frames among the image frames, generate an integral histogram by combining the unit histograms, and generate a knee curve from the integral histogram. The natural number m may be equal to n, but is not particularly limited thereto.

Generally, when one WDR image is generated by combining n subchannels included in one image frame, the dynamic range of the WDR is significantly increased as compared with the original subchannel. This is because the WDR image is generated by multiplying individual subchannel images generated by variable exposure control by a gain value inversely proportional to the exposure time and synthesizing the subchannel images. For example, if n is 4, there may exist four subchannels including very long (VL), long (L), short (S), and very short (VS) according to the exposure time. Assuming that the dynamic range of an image of each subchannel is 12 bits, the dynamic range of the WDR image generated by synthesizing the subchannels may increase up to 23 bits. As described above, if the number of bits per frame increases rapidly, there arises a problem that much more system resources (e.g., CPU consumption, memory capacity, network bandwidth, etc.) are required for an image of the same resolution. Accordingly, a process of reducing (i.e., compressing) the increased dynamic range back to the level of the original subchannel is required while synthesizing the WDR image as intended.

To this end, a dynamic range transforming unit 78 may reduce (i.e., compress) a dynamic range of the synthesized WDR image by using the knee curve generated by the knee curve generating unit 60, thereby generating a transformed image.

Figure 14:
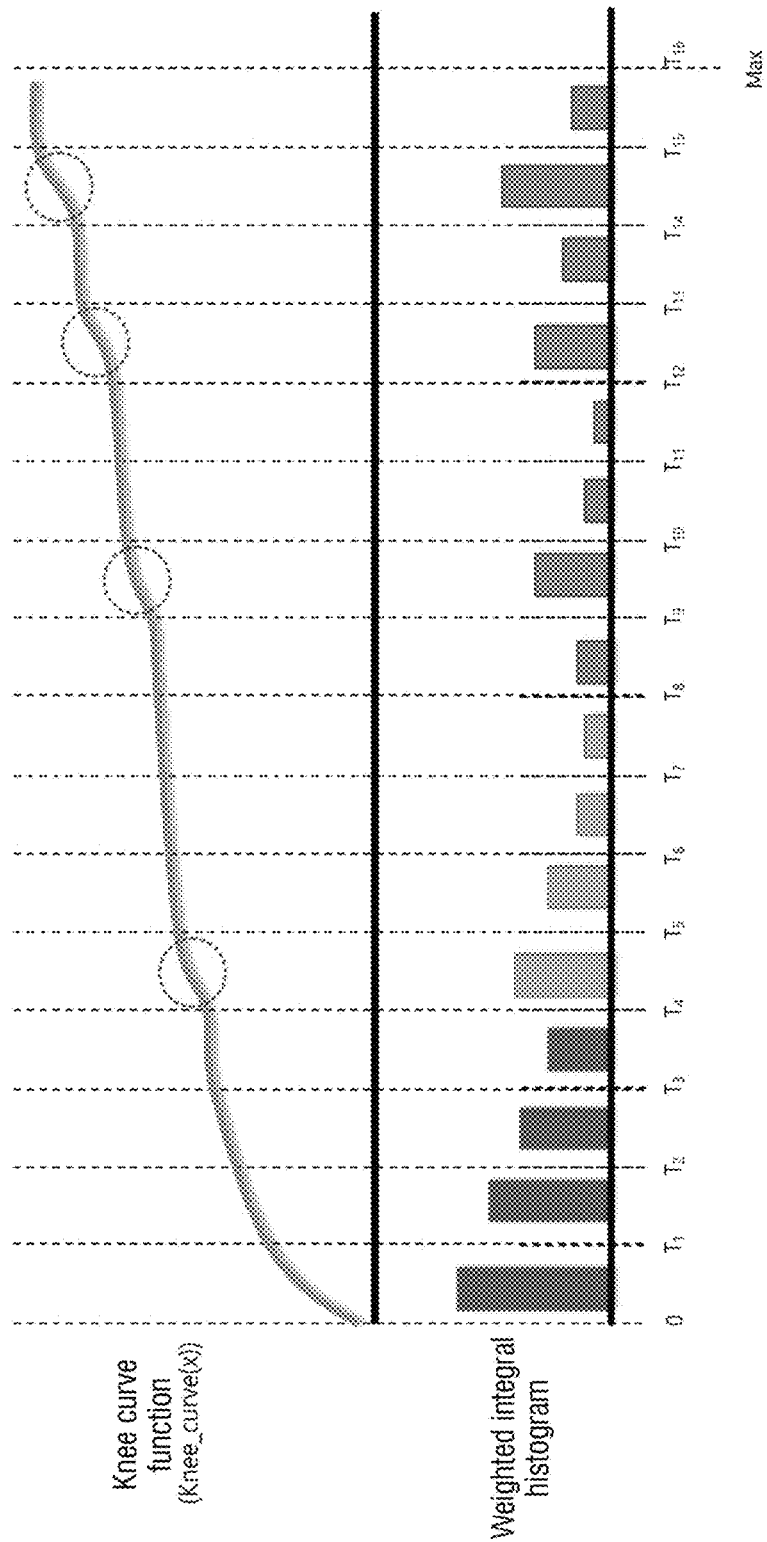
FIG. 14 is a diagram illustrating a knee curve function according to an exemplary embodiment.

For example, the dynamic range transforming unit 78 may compress the dynamic range by using the knee curve illustrated in FIG. 14. In FIG. 14, a horizontal axis represents a luminance value before the dynamic range transformation (i.e., input luminance level), and a vertical axis represents a luminance value after the dynamic range transformation (i.e., output luminance level). The dynamic range of the WDR frame may be reduced to be similar to a dynamic range of the subchannel through a process of transforming the input luminance level into the output luminance level.

An image signal processing unit 80 performs post-processing with respect to the transformed image provided by the dynamic range transforming unit 78. The post-processing may include, but is not limited to, adjustment of a white balance, gamma processing, gain adjustment, and the like. An image encoding unit 41 reads the WDR frame stored in an image memory 26, performs an image encoding process of the WDR frame, and stores the processed data in the image memory 26 again.

The WDR frame (e.g., still image or moving picture) output from the image signal processing unit 80 may be stored in the image memory 26. Non-limiting examples of the image display unit 28 may be a liquid crystal display (LCD), an organic light-emitting diode (OLED), a cathode ray tube (CRT), and the like. The image display unit 28 displays the WDR frame recorded in the image memory 26 on a screen. Further, the image display unit 28 may be turned on/off according to an instruction from an operation unit 43.

The image encoding unit 41 reads the WDR frame stored in the image memory 26, performs the image encoding process of the WDR frame, and stores the processed data in the image memory 26 again.

The operation unit 43 may input various operation instructions to a system processor 40. The operation unit 43 may include a switch or a dial, a touch panel, pointing by sight detection, a voice recognition device, and/or the like. A user may set various functions including power on/off, WDR mode on/off, zoom in/out, image display unit on/off, and the like through the operation unit 43.

The sensor control unit 42 may control a mechanical or electronic shutter provided in the WDR image sensor 20. Further, the sensor control unit 42 may also control a flash dimming function by interlocking with a flash (not illustrated). Further, a lens control unit 44 may control a focus or a zoom magnification of the photographing lens 10. In addition, the sensor control unit 42 may set the WDR mode according to the control of the system processor 40. The WDR mode represents the number of subchannels used for synthesizing one WDR image and is generally set to the power of 2 such as 2 or 4.

In an exemplary embodiment, the sensor control unit 42 may adaptively change the WDR mode using the integral histogram calculated by the knee curve generating unit 60. For example, assuming that the WDR image sensor 20 supports a normal mode (i.e., WDR disabled), a 2 WDR mode and a 4 WDR mode, the sensor control unit 42 controls the WDR image sensor 20 so that it can be adaptively switched between the three modes according to the characteristics of the current scene recognized through the integral histogram. For example, when the current WDR mode is the 4 WDR mode in which four subchannels are synthesized, the system processor 40 may determine that the amount of light incident on the photographing lens 10 is insufficient based on the calculated integral histogram. In this case, the WDR mode can be switched from the 4 WDR mode to the 2 WDR mode in which two subchannels are synthesized. Thereafter, if it is determined that the amount of incident light is sufficient based on the analysis result of the calculated integral histogram, the WDR mode may be switched again from the 2 WDR mode to the 4 WDR mode. This mode switching can be similarly applied between the 2 WDR mode and the normal mode and between the 4 WDR mode and the normal mode. Eventually, the sensor control unit 42 may control the WDR image sensor 20 to adaptively select one of a plurality of WDR modes including, for example, a normal mode, a 2 WDR mode and a 4 WDR mode through scene analysis based on the integral histogram.

The system processor 40 may control overall operations of an image processing apparatus 100. A program executed by the system processor 40 may be recorded in the system memory 46. The system memory 46 may also store system information and/or user setting information. Examples of the system memory 46 may include, but are not limited to, a random access memory (RAM), a flash memory, a solid state disk (SSD), or the like.

In addition, a communication unit 48 has a communication function such as USB, IEEE1394, LAN, etc. and may receive a control signal from the image processing apparatus 100 and/or another apparatus. The communication unit 48 may transmit the generated WDR frame to another apparatus.

Figure 4:
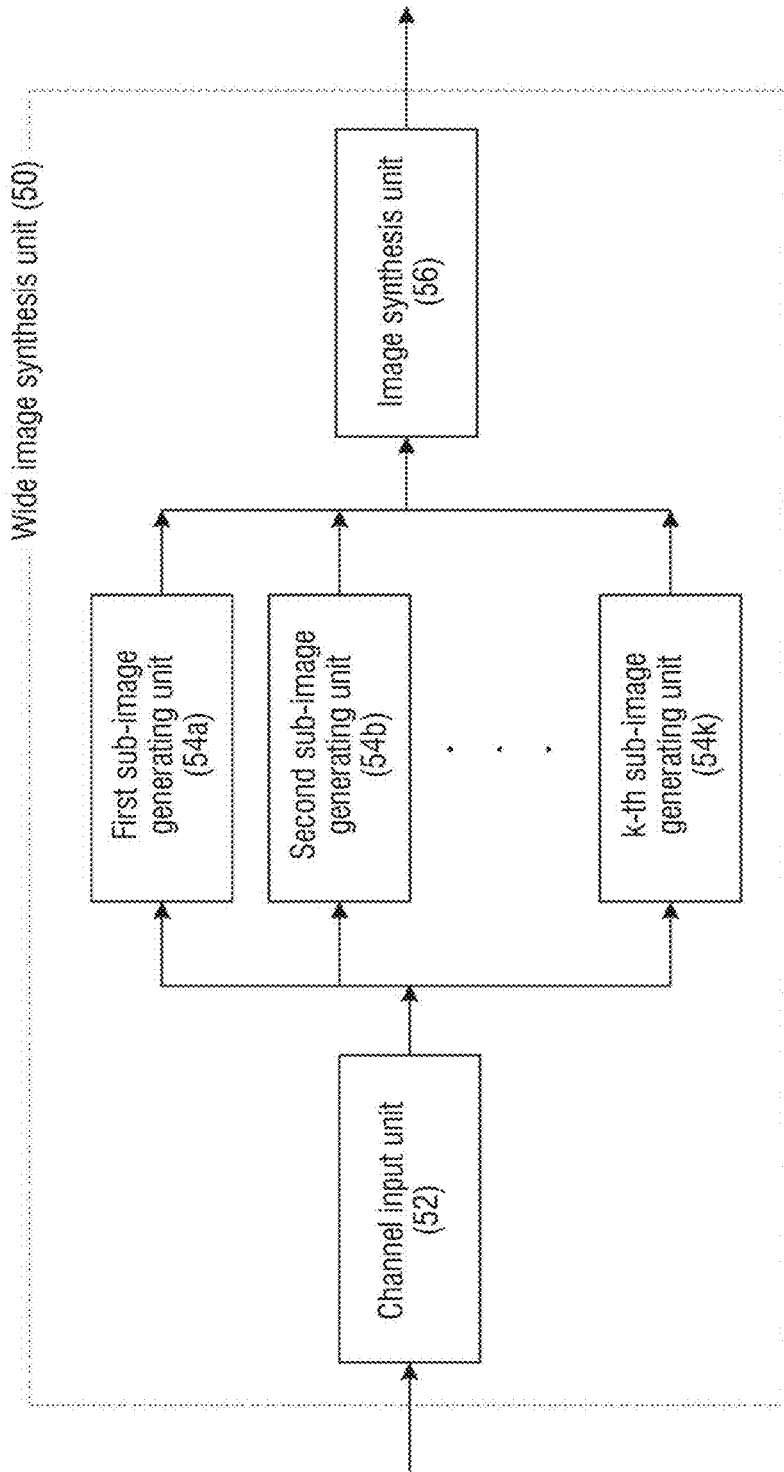
FIG. 4 is a block diagram illustrating a detailed configuration of a wide image generating unit according to an exemplary embodiment.

FIG. 4 is a block diagram illustrating a detailed configuration of a wide image synthesis unit 50. The wide image generating unit 50 may be configured to include a channel input unit 52, subchannel generating units 54a, 54b . . . 54k, and an image synthesis unit 56.

The channel input unit 52 sequentially receives an input of n subchannels from the memory access unit 30. The subchannel generating units 54a, 54b . . . 54k generate a plurality of sub-images from the respective subchannels sequentially input from the channel input unit 52. The image synthesis unit 56 generates a synthesized image by synthesizes pixels of the plurality of sub-images. Here, the pixel may have an RGB data format, a YUV data format, or a YCbCr data format, but is not limited thereto.

Figure 5:
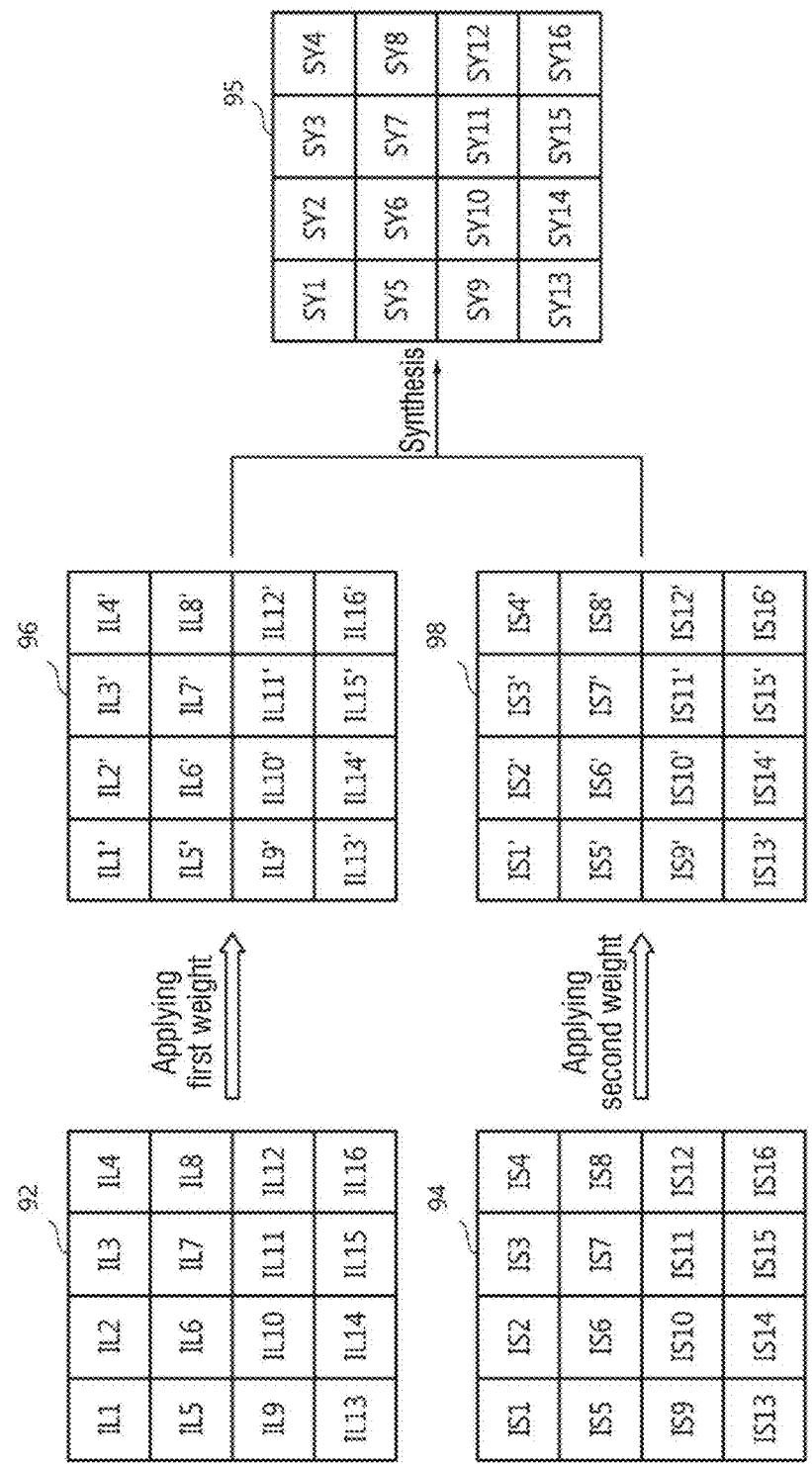
FIG. 5 is a block diagram illustrating a subchannel synthesis process according to an exemplary embodiment.

FIG. 5 is a block diagram illustrating a subchannel synthesis process performed by a wide image synthesis unit 50 of FIG. 2. A first subchannel generating unit 54a generates a first sub-image 92 photographed with a relatively long shutter time and a second sub-channel generating unit 54b generates a second sub-image 94 photographed with a relatively short shutter time.

The image synthesis unit 56 obtains a first weighted sub-image 96 by applying a first weight to the first sub-image 92, and obtains a second weighted sub-image 98 by applying a second weight to the second sub-image 94. Then, the image synthesis unit 56 adds pixels at corresponding locations in the weighted sub-images 96 and 98 to generate one WDR frame 95. In this case, the sum of the first weight and the second weight may be 1. The same weight may be assigned to pixels of the same sub-image. Alternatively, different weights may be assigned to different areas (or blocks) within the same sub-image. In FIG. 5, it is exemplified that two sub-image are synthesized, but the same is applied even when four or different numbers of sub-images are synthesized.

Figure 6:
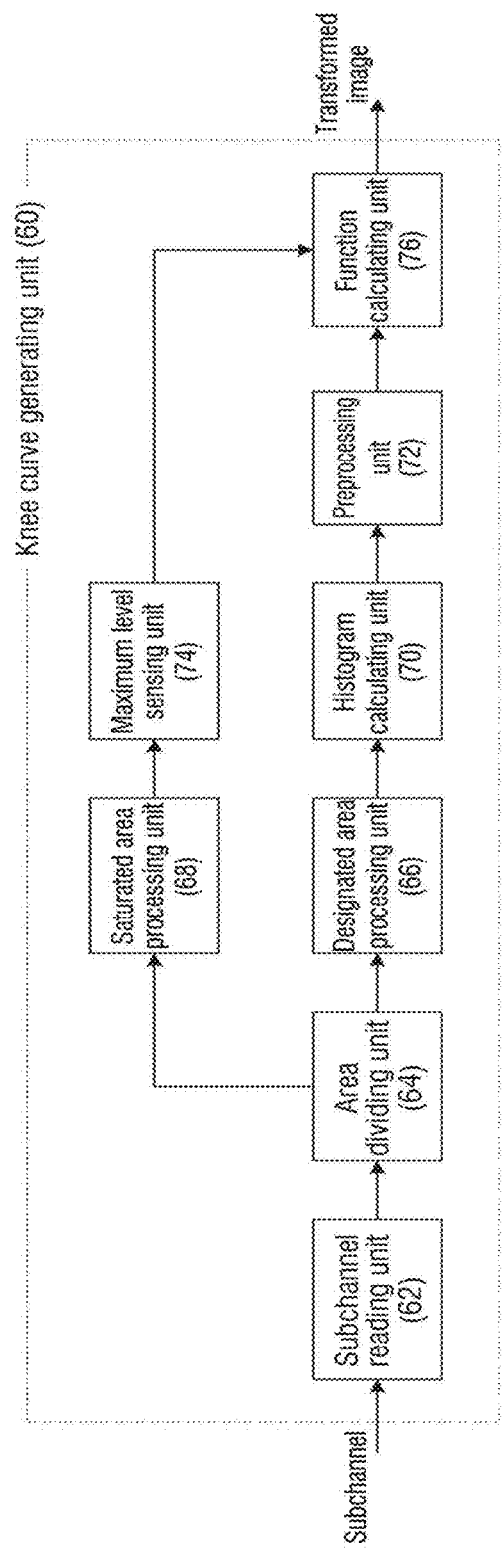
FIG. 6 is a block diagram illustrating a configuration of a knee curve generating unit according to an exemplary embodiment.

FIG. 6 is a block diagram illustrating a detailed configuration of a knee curve generating unit 60. The knee curve generating unit 60 generates unit histograms from the luminance levels of a total of m×n subchannels included in m image frames, combines the generated unit histograms, and generates the knee curve from the integral histogram. The m and n may be the natural numbers and in particular, may be the power of 2. The m and n may be the same number. In the following description, it will be described that m and n are assumed to be equally 4 as an example.

In FIG. 6, the knee curve generating unit 60 may be configured to include a subchannel reading unit 62, an area dividing unit 64, a designated area processing unit 66, a saturated area processing unit 68, a histogram calculating unit 70, a preprocessing unit 72, a maximum level sensing unit 74, and a function calculating unit 76.

First, the subchannel reading unit 62 reads the subchannels provided from the memory access unit 30 for each subchannel.

Figure 7:
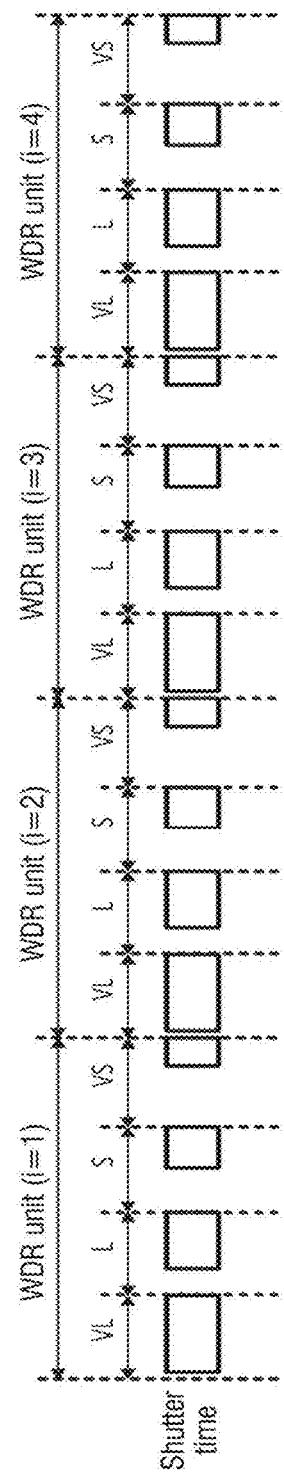
FIG. 7 is a diagram illustrating a plurality of WDR units and a plurality of subchannels according to an exemplary embodiment.

The area dividing unit 64 divides each of a total of 4×4 (i.e., 16) subchannels into the designated area and the saturated area. Referring to FIG. 7, one WDR unit includes subchannels VL, L, S, and VS having four different shutter times. One WDR unit is a basic unit for generating one WDR frame. The WDR unit (i=1 to 4) is consecutively generated at a predetermined time interval depending on a frame rate. As described above, when one image frame (i.e., WDR unit) has four subchannels, a total of 16 subchannels may be used as basic information for the dynamic range transformation with reference to four frames.

A designated area processing unit 66 sets extraction areas having a lower threshold luminance value and an upper threshold luminance value based on the luminance level of the designated area, and counts the number of pixels included in the extraction area. In this case, the designated area processing unit 66 may set the extraction areas not to overlap with each other among subchannels having the same shutter time among 4×4 subchannels. Here, the extraction areas are set not to overlap among the subchannels which belong to different WDR units and have the same shutter time.

Meanwhile, the saturated area processing unit 68 counts the number of pixels included in the saturated area.

Figure 8:
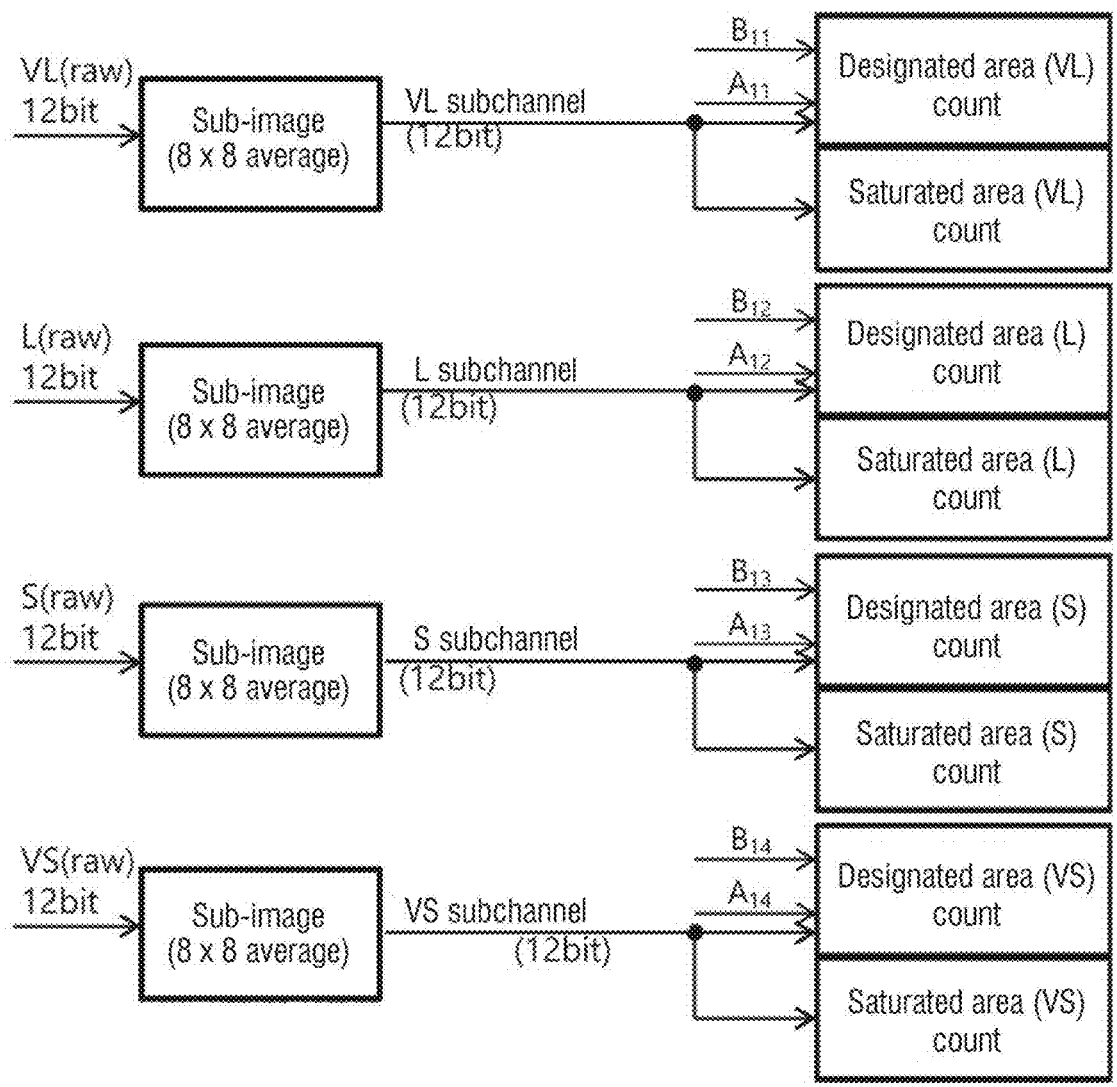
FIG. 8 is a diagram illustrating a method of dividing and counting each subchannel into a designated area and a saturated area, according to an exemplary embodiment.

FIG. 8 is a diagram illustrating a specific method of dividing each subchannel into a designated area and a saturated area. Here, the designated area and the saturated area of four subchannels are divided for one WDR frame (i=1). First, each sub-image may be directly input into the subchannel. Alternatively, a process of obtaining an average of blocks having a size of 8×8 blocks and downsampling the obtained average to one sample may be additionally performed in order to reduce the amount of computation in a subsequent process. The designated area and the saturated area are determined with respect to each of four subchannels obtained through the downsampling process. Here, the saturated area is an area of a pixel having a luminance of a predetermined level or more, which causes luminance saturation making the area difficult to visually distinguish. The designated area may refer to the area other than the saturated area in each subchannel.

The designated area processing unit 66 sets a lower threshold value A and an upper threshold value B with respect to the designated area, and counts the number of pixels having luminance therebetween. An area of such pixels is referred to as an extraction area.

In this case, all of the extraction areas are not extracted from one frame (e.g., i=1 in FIG. 9), but are preferably extracted from a plurality of frames. Such a scheme prevents the knee curve for dynamic area compression from being too rapidly changed and also prevents large distortion even if unpredictable noise is present in some subchannels. Further, setting multiple threshold values from one subchannel in a specific frame increases a load on the system, which may burden smooth processing of real-time WDR images.

In addition, how many frames to specifically consider for n subchannels is an element to be considered. Preferably, the number of subchannels may be equal to the number of frames, considering both a calculation amount of the dynamic range compression and a quality of image transformation. Such a point may be verified through a simulation via various images.

Figure 9:
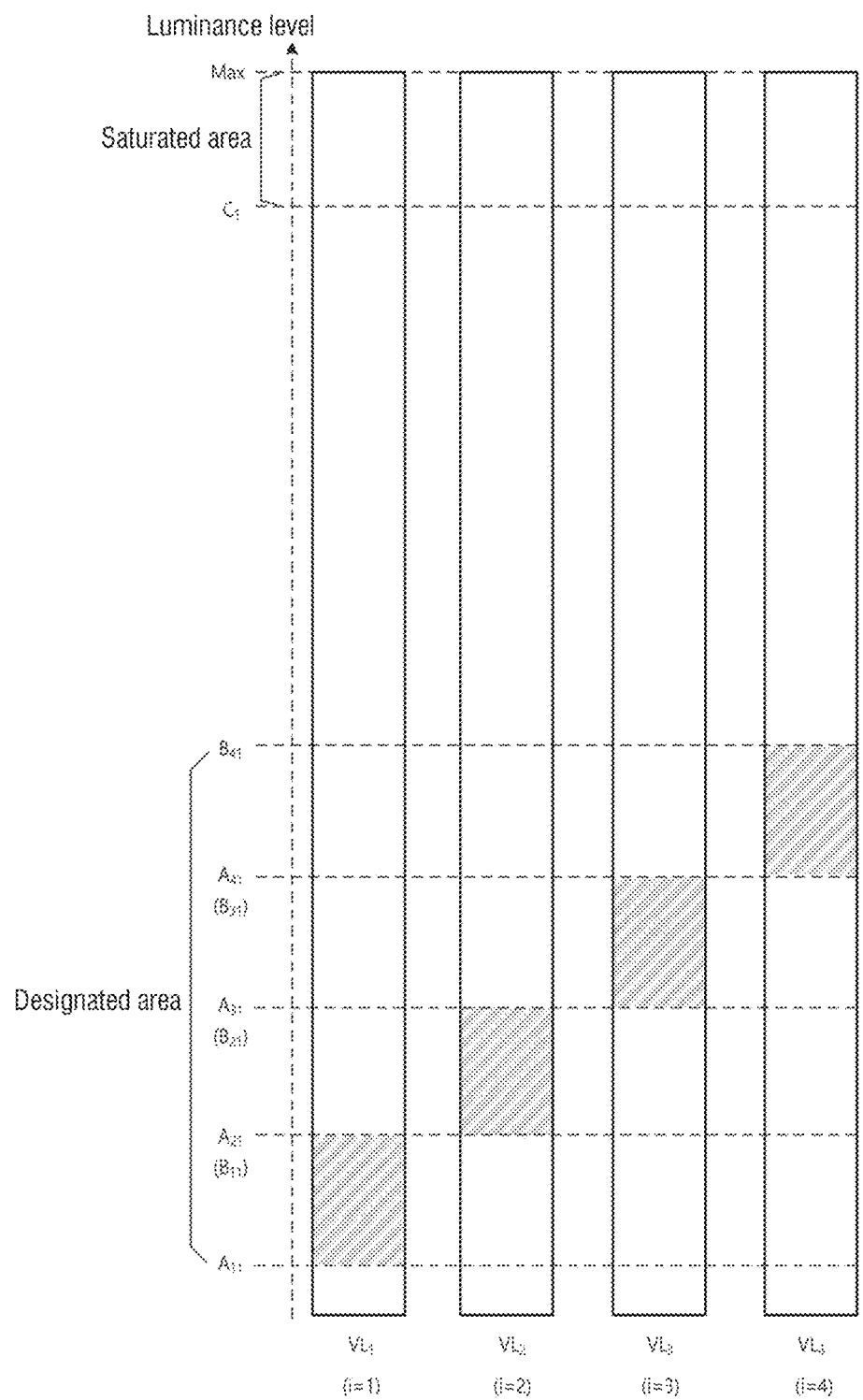
FIG. 9 is a diagram illustrating a method of setting an extraction area by referring to four consecutive frames with respect to subchannels having the same shutter speed, according to an exemplary embodiment.

FIG. 9 is a diagram illustrating an example of setting an extraction area for subchannels having the same shutter speed (e.g., VL) by referring to four consecutive frames (I=1 to 4). In FIG. 9, the symbols "Amn" and "Bmn" represent a lower threshold value and a upper threshold value of an n-th subchannel in an m-th frame, respectively.

The lower threshold value A and the upper threshold value B may be set such that the extraction areas on the respective subchannels do not overlap. In this case, an upper threshold value (e.g., B11) of the subchannel (VL1) of a previous frame (i=1) may match a lower threshold value (e.g., A21) of the subchannel (VL2) of a subsequent frame (i=2).

In an exemplary embodiment, the extraction areas may be set to slightly overlap with each other. In this case, the number of pixels in the overlapped areas may be counted in both extraction areas.

The saturated area having a luminance level greater than a reference value C1 is difficult to visually distinguish because such an area is visually saturated. However, since the saturated area is present in the four subchannels VL1 to VL4, the saturated area processing unit 68 may count all of four saturated areas, or may just count a saturated area in the first subchannel VL1.

Four extraction areas may be obtained with respect to one subchannel VL as described above. Similarly, since four extraction areas may be obtained for each of other subchannels L, S, and VS, the number of extraction areas will be consequently 16 in total. In this case, similarly, the ranges of the extraction areas obtained in one subchannel are also preferably prevented from overlapping with the ranges of the extraction areas obtained in another subchannel. For example, VL covers a relatively dark luminance area, VS covers a relatively bright luminance area, and L and S cover the other areas having luminance therebetween.

Figure 10:
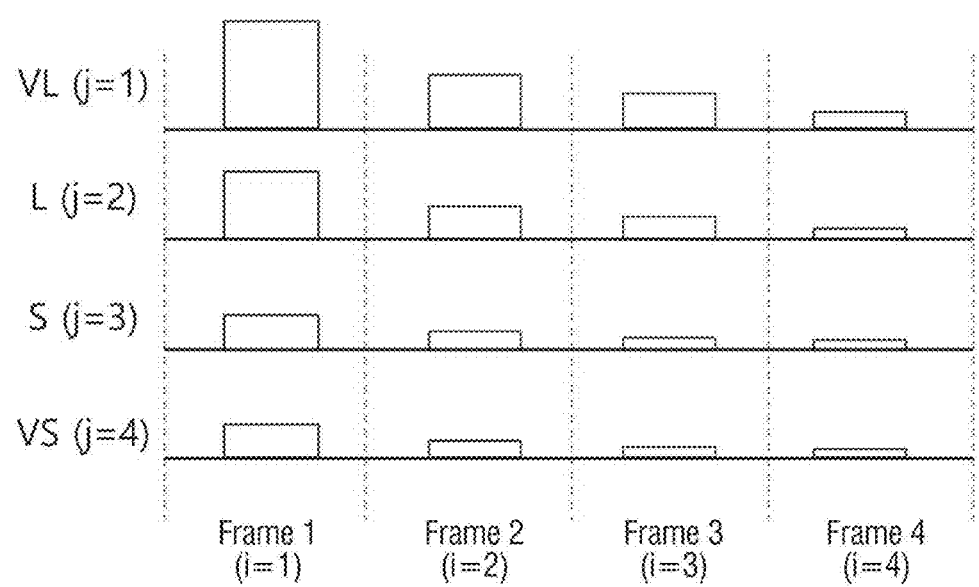
FIG. 10 is a diagram illustrating a concept of an extraction area obtained in a total of 16 subchannels, according to an exemplary embodiment.

Through the above process, in a case where one frame has four subchannels, when up to four frames are considered, one extraction area is obtained in each of a total of 16 subchannels. Thus, as illustrated in FIG. 10, a total of 16 extraction areas are obtained as basic data for obtaining one knee curve transformation function.

Figure 11:
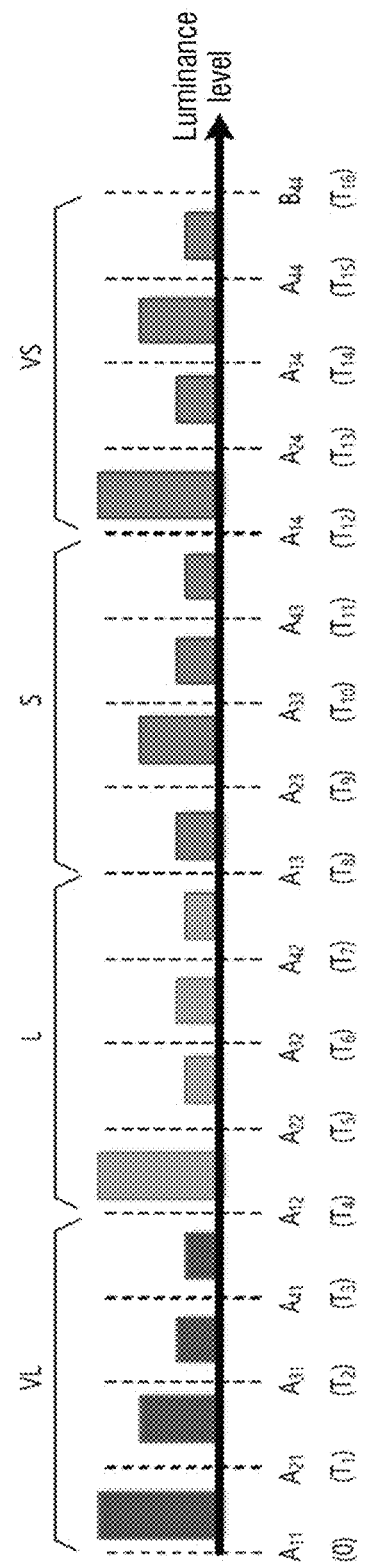
FIG. 11 is a diagram illustrating an integral histogram according to an exemplary embodiment.

FIG. 11 is a diagram illustrating an integral histogram according to an exemplary embodiment. The histogram calculating unit 70 of FIG. 6 calculates the integral histogram based on the number of pixels, which is counted in the extraction areas. Specifically, the histogram calculating unit 70 arranges numbers (i.e., 16 unit histograms) counted in a total of 16 extraction areas from the lowest luminance level to the highest luminance level, thereby obtaining the integral histogram as shown in FIG. 11. Here, the subchannel VL having a longest shutter time covers a dark area of the scene, and the subchannel VS having a shortest shutter time covers a bright area of the scene. As aforementioned, in FIG. 9, the symbols "Amn" and "Bmn" represent a lower threshold value and a upper threshold value of an n-th subchannel in an m-th frame, respectively. The threshold values may be represented by 0, T1, T2 . . . T16 in the integral histogram as shown in FIG. 11.

The preprocessing unit 72 normalizes the calculated integral histogram and applies the weight to each interval of the normalized integral histogram. The normalization process may be obtained by calculating the sum of all unit histograms and dividing each unit histogram by the sum. Accordingly, a total sum of the unit histograms to which normalization is applied becomes 1.

Figure 12:
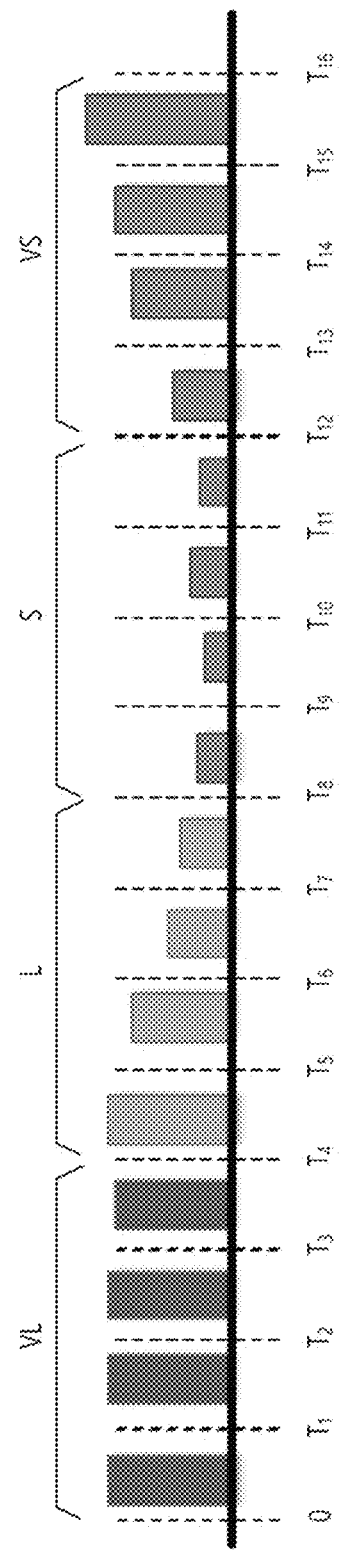
FIG. 12 is a diagram illustrating a weight corresponding to each interval of the integral histogram according to an exemplary embodiment.

FIG. 12 is a diagram illustrating the weights applied to the integral histogram according to an exemplary embodiment.

In FIG. 12, sixteen bar graphs represent magnitudes of the weights for the corresponding histograms, respectively. The preprocessing unit 72 may apply a different weight for each interval of the normalized integral histogram. Preferably, the preprocessing unit 72 may apply a relatively high weight to an interval having a low luminance level and/or an interval having a high luminance level, compared to other intervals having a medium luminance level, as illustrated in FIG. 12. The dark area and the bright area have inferior visibility in the WDR image, so a higher bit may be allocated to the areas by applying higher weights to those areas.

The preprocessing unit 72 multiplies the integral histogram by each of the obtained weights for each interval to generate a weighted integral histogram. The preprocessing unit 72 provides the generated weighted integral histogram to the function calculating unit 76.

Referring back to FIG. 6, the maximum level sensing unit 74 may sense a maximum level value by comparing the number of pixels included in the saturated area with a maximum threshold value predetermined for each subchannel, in ascending order of the shutter time applied to the subchannels. The maximum level value may have a single value for the entire integral histogram.

Figure 13:
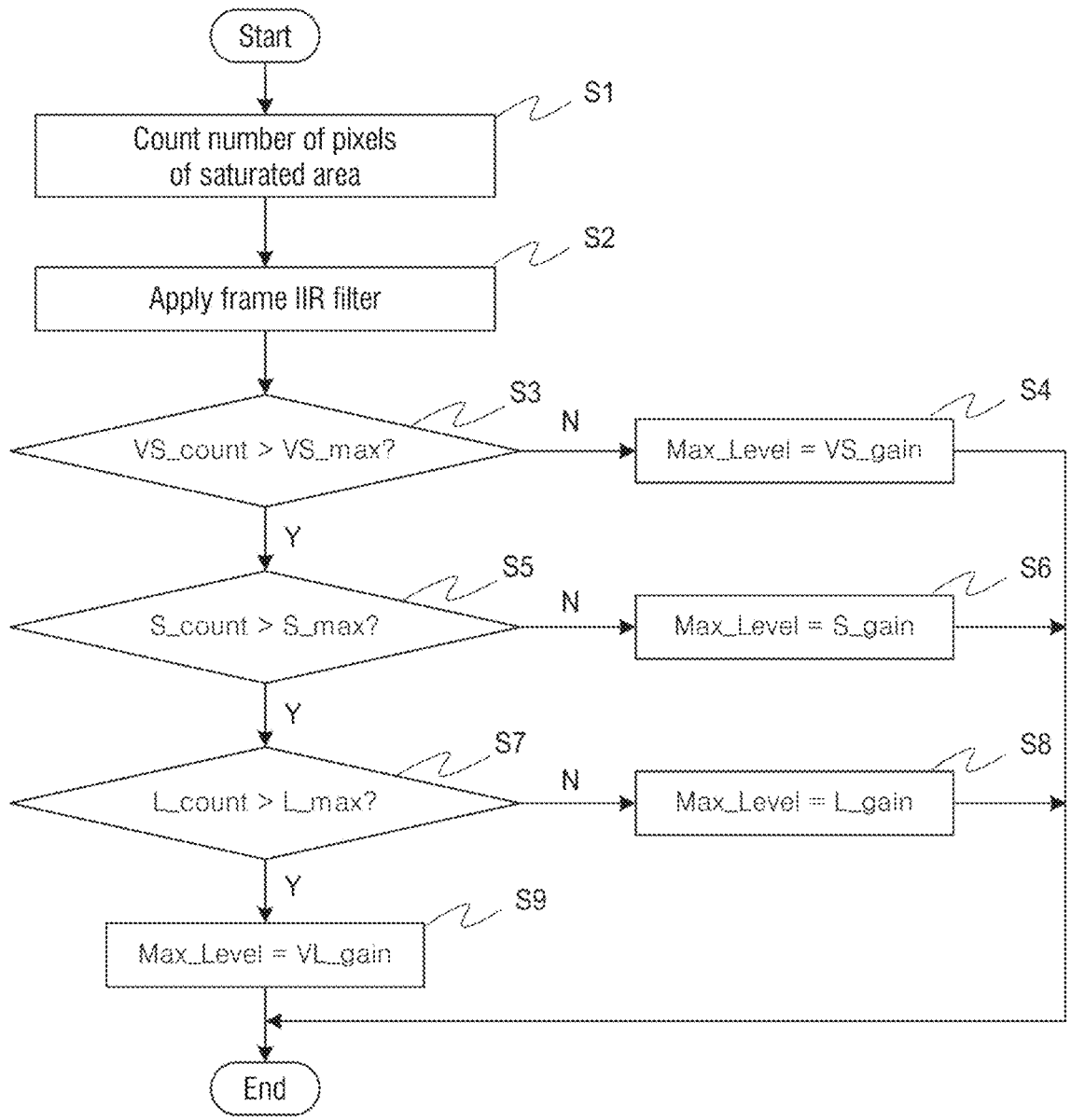
FIG. 13 is a flowchart showing an operation in a maximum level sensing unit according to an exemplary embodiment.

FIG. 13 is a flowchart specifically showing an operation in a maximum level sensing unit 74.

The saturated area processing unit 68 counts the number of pixels included in the saturated area (S1).

The saturated area processing unit 68 may additionally apply an impulse response filter (IIR) filter (S2).

Then, when a saturated area count VS_count of the very short (VS) subchannel is not larger than a predetermined threshold value VS_max of the VS subchannel (N in S3), the maximum level sensing unit 74 sets a gain value VS_gain of the VS subchannel to the maximum level value (S4). Otherwise (Y in S3), the process proceeds to S5.

When a saturated area count S_count of the short (S) subchannel is not larger than a predetermined threshold value S_max of the S subchannel (N in S5), the maximum level sensing unit 74 sets a gain value S_gain of the S subchannel to the maximum level value (S6). Otherwise (Y in S5), the process proceeds to S7.

When a saturated area count L_count of the long (L) subchannel is not larger than a predetermined threshold value L_max of the L subchannel (N in S7), the maximum level sensing unit 74 sets a gain value L_gain of the L subchannel to the maximum level value (S8). Otherwise (Y in S7), the maximum level sensing unit 74 sets the gain value VL_gain of the very long (VL) subchannel to the maximum level value (S9).

As described above, when the number of pixels included in the saturated area of a current subchannel does not exceed a maximum threshold value predetermined for the current subchannel, the maximum level sensing unit 74 sets a gain value of the current subchannel to the maximum level value. Otherwise, the number of pixels included in the saturated area of the next subchannel (i.e., subchannel of next longer shutter time) is compared with a maximum threshold value predetermined for the next subchannel.

The gain value means a luminance increase value (i.e., luminance weight) given to each subchannel when one WDR image is synthesized from a plurality of subchannels.

Referring back to FIG. 6, the function calculating unit 76 calculates a slope for each interval of the integral histogram, and calculates the knee curve function for the entire luminance level based on the slope for each interval and the sensed maximum level value. The slope for each interval may be determined by using, for example, a gamma curve.

Specifically, when there are a first interval immediately precedes a second interval in the integral histogram, and a second interval has the counted number of pixels greater than that of the first interval, the function calculating unit 76 preferably calculates the knee curve function so that the slope in the second interval increases as compared with the first interval.

Equation 1 below shows a specific example of a knee curve function Knee_curve(x) for each specific interval.

$$\text{Knee\_curve}(x) \begin{cases} \dfrac{T_1}{M} \times \dfrac{x}{M} & (\text{for } 0 < x < T_1) \\ a \times \left[\dfrac{x}{M}\right]^{w_{k+1}} - a + 1 & (\text{for } T_k < x < T_{k+1}) \end{cases} \quad \text{[Equation 1]}$$

Here, x represents the input luminance level value, Tk represents threshold values in the integral histogram, and M represents the maximum level value set in the maximum level sensing unit 74. Further, wk+1 represents a value in a k+1-th interval in the weighted integral histogram calculated in the preprocessing unit 72.

Meanwhile, in Equation 1, a coefficient a may be expressed as shown in Equation 2 below.

$$a = \frac{\left[\dfrac{T_k}{M}\right]^2 - 1}{\left[\dfrac{T_k}{M}\right]^{w_{k+1}} - 1} \quad \text{[Equation 2]}$$

When the knee curve functions for the intervals are connected, the integrated knee curve function illustrated in FIG. 14 may be obtained. Such an integrated knee curve function has several following characteristics.

First, Knee_curve(x) is continuous at each boundary point. For example, referring to Equation 1, at x=T1, Knee_curve(x) has a value of $(T1/M)^2$ in both a left interval and a right interval.

Second, an interval having a greater value of the weighted integral histogram has a greater slope of the function increases. In Equation 1, it may be seen that as wk+1 increases, the slope of $$\left[\frac{x}{M}\right]^{w_k+1}$$

also increases (see the dotted circles in FIG. 14).

Third, all input luminance levels x are scaled by the maximum level value M and input in a form of x/m. Therefore, there is an effect that the input luminance level x is scaled by the maximum level value M that is decided based on the count of the saturated area of the subchannels as shown in the algorithm of FIG. 13.

The knee curve function may be adaptively calculated according to a characteristic of the image of the subchannel due to three characteristics of the knee curve function as described above. Thus, for the dynamic range compression, if a certain neural curve function is used in first four frames, a different knee curve function may be used adaptively in next four frames.

The dynamic range transforming unit 78 of FIG. 2 compresses the dynamic range of the synthesized image provided by the wide image synthesis unit 50 by using the knee curve function. In FIG. 14, a horizontal axis represents the input luminance level x, and a vertical axis represents an output luminance level. It may be seen that the dynamic range is reduced because the bit amount of the vertical axis is smaller than the bit amount of the horizontal axis.

Figure 15:
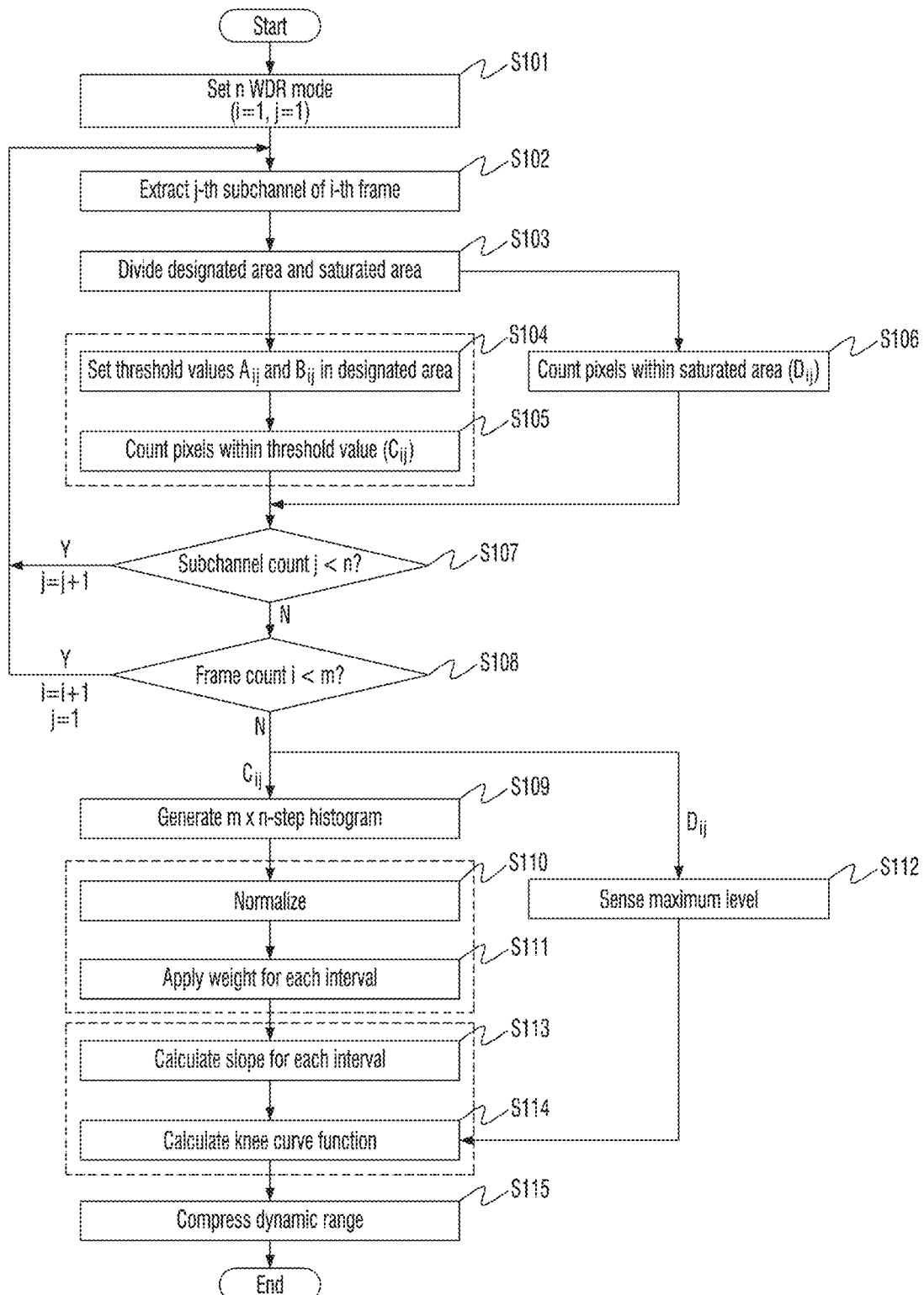
FIG. 15 is a flowchart for describing an image processing method according to an exemplary embodiment.

FIG. 15 is a flowchart for describing an image processing method according to an exemplary embodiment.

The sensor control unit 42 sets the WDR image sensor 20 to n WDR mode for synthesizing the WDR image from n subchannels (S101). Initially, both frame index i and subchannel index j are set to 1.

Subsequently, the subchannel reading unit 62 of the knee curve generating unit 60 reads j-th subchannel of i-th frame (S102).

The area dividing unit 64 divides the read subchannel into the designated area and the saturated area (S103).

The designated area processing unit 66 sets lower and upper threshold values Aij and Bij in the designated area (S104), and counts the number of pixels, Cij, having luminance between the two threshold values (i.e., count the number of pixels in the extraction area) (S105).

The saturated area processing unit 68 counts the number of pixels, Dij in the divided saturation area (S106).

Next, if the subchannel count j is smaller than n (Y in S107), the knee curve generating unit 60 increments j by 1 and proceeds to S102 again. If j and n are equal to each other (N in S107), the knee curve generating unit 60 determines whether the frame count i is smaller than m (S108). In this case, if i is larger than m (Y in S108), i is incremented by 1 and then the process proceeds to S102 again. If i is equal to m (N in S108), since the processing for all of m image frames is completed, the process proceeds to S109.

In S109, the histogram calculating unit 70 calculates the integral histogram acquired by summing the total of m×n unit histograms which are generated based on the number of pixels Cij in the extraction region (S109).

The preprocessing unit 72 normalizes the integral histogram (S110) and applies a different weight to each interval of the integral histogram to generate the weighted integral histogram (S111).

Meanwhile, the maximum level sensing unit 74 senses the maximum level through the procedure of FIG. 13 with reference to the number of pixels Dij in the saturation region (S112).

The function calculating unit 76 calculates the slope for each interval of the knee curve function based on the weighted integral histogram and the maximum level (S113). The function calculating unit 76 calculates the knee curve function for the entire subchannels by connecting the slope for each interval (S114).

The dynamic range transforming unit 78 compresses the dynamic range of the synthesized image provided by the wide image synthesis unit 50 by using the calculated knee curve function (S115).

The components of FIGS. 2 to 4 and 6 (e.g., "units") may be implemented as software such as a task, a class, a sub routine, a process, an object, an execution thread, and a program performed in a predetermined area on the memory or hardware such as field programmable gate array (FPGA) or application-specific integrated circuit (ASIC) and further, may be achieved by combining the software and the hardware. The components may be included in a computer readable storage medium and some of the component may be dispersively distributed.

Also, the components may be implemented using at least one processor such as a central processor (CPU), a microcontroller unit (MCU), a digital signal processor (DSP), etc. Such a processor may execute computer executable instructions stored in at least one memory to perform their functions described in this disclosure.

Further, each block may represent a part of a module, a segment, or a code that includes one or more executable instructions for executing a specified logical function(s). In addition, in several alternative execution examples, functions mentioned in blocks may occur out of sequence. For example, two successive illustrated blocks may in fact be performed substantially concurrently and the blocks may be sometimes performed in reverse order according to the corresponding function.

What is claimed is:

1. An image processing apparatus comprising:
 a wide dynamic range (WDR) image sensor configured to output image frames by photographing a subject with different shutter times; and
 at least one processor to implement:
 a wide image synthesis unit configured to synthesize a WDR image based on n subchannels included in each of the image frames;
 a knee curve generating unit configured to generate an integral histogram of luminance levels of m×n subchannels included m image frames among the image frames, and generate a knee curve based on the integral histogram, where m and n each is an integer greater than zero; and
 a dynamic range transforming unit configured to reduce a dynamic range of the WDR image based on the generated knee curve,
 wherein the m image frames correspond to m consecutive image frames, and wherein the n subchannels correspond to n images acquired with different exposure times in each of the m image frames.

2. The image processing apparatus of claim 1, wherein each of m, and n is 4 and n subchannels are very long (VL), long (L), short (S), and very short (VS) channels.

3. The image processing apparatus of claim 1, wherein the knee curve generating unit comprises:
an area dividing unit configured to detect a designated area comprising non-saturated pixels from each of the m×n subchannels,
a designated area processing unit configured to set an extraction area in the designated area by setting a lower threshold luminance value and an upper threshold luminance value, and count a number of pixels included in the extraction area, and
a histogram calculating unit configured to calculate a unit histogram for each of the m×n subchannels based on the counted number of pixels, and generate the integral histogram by combining unit histograms for the m×n subchannels.

4. The image processing apparatus of claim 3, wherein the designated area processing unit is further configured to set extraction areas not to overlap among subchannels which belong to different image frames and have a same shutter time.

5. The image processing apparatus of claim 4, wherein the histogram calculating unit is further configured to count the number of pixels included in each of the extraction areas and generate the integral histogram by arranging counted numbers corresponding to the m×n subchannels.

6. The image processing apparatus of claim 3, wherein the knee curve generating unit further comprises a preprocessing unit configured to normalize the integral histogram and apply a weight for each interval to the normalized integral histogram.

7. The image processing apparatus of claim 6, wherein the preprocessing unit is further configured to apply a relatively high weight to an interval having a lowest luminance level and an interval having a highest luminance level in the normalized integral histogram.

8. The image processing apparatus of claim 3, wherein the area dividing unit is further configured to detect a saturated area from each of the m×n subchannels in addition to the designated area, and
wherein the knee curve generating unit further comprises a saturated area processing unit configured to count a number of pixels included in the saturated area.

9. The image processing apparatus of claim 8, wherein the knee curve generating unit further comprises a maximum level sensing unit configured to sense a maximum level value by comparing the number of pixels included in the saturated area and a maximum threshold value predetermined for each subchannel, in ascending order of a shutter time applied to each subchannel,
wherein when the number of pixels included in the saturated area of a current subchannel does not exceed a maximum threshold value for the current subchannel, the maximum level sensing unit sets a gain value of the current subchannel as the maximum level value, and
wherein a knee curve generating unit is further configured to generates the knee curve based on the maximum level value.

10. A wide dynamic range (WDR) image processing method comprising:
generating image frames by photographing a subject with different shutter times;
setting an extraction area having a lower threshold luminance value and an upper threshold luminance value with respect to each of m×n subchannels included in m image frames among the image frames, each image frame having n subchannels;
counting a number of pixels included in the extraction area;
calculating a unit histogram for each of the m×n subchannels based on the counted number of pixels;
generating an integral histogram by combining unit histograms corresponding to the m×n subchannels;
generating a knee curve based on the generated integral histogram;
synthesizing a WDR image by synthesizing the n subchannels for each of the image frames; and
reducing a dynamic range of the synthesized WDR image based on the generated knee curve,
wherein the setting of the extraction area comprises setting extraction areas not to overlap among subchannels which belong to different image frames and have a same shutter time.

11. The WDR image processing method of claim 10, wherein the extraction areas belong to m consecutive image frames, respectively.

12. The WDR image processing method of claim 11, wherein the generating of the integral histogram comprises counting a number of pixels included in the extraction area, and generating the integral histogram by arranging counted numbers corresponding to the m×n subchannels.

13. The WDR image processing method of claim 10, wherein the generating of the knee curve comprises normalizing the generated integral histogram and applying a weight for each interval to the normalized integral histogram.

14. A wide dynamic range (WDR) image processing method comprising:
outputting image frames by photographing a subject with different shutter times;
synthesizing a WDR image based on n subchannels included in each of the image frames;
calculating a unit histogram based on a luminance level with respect to each of m×n subchannels included in m image frames among the image frames;
generating an integral histogram by combining the generated unit histograms; and
reducing a dynamic range of the WDR image based on the integral histogram,
wherein the m image frames correspond to m consecutive image frames, and
wherein the n subchannels correspond to n images acquired with different exposure times in each of the m image frames.

15. The WDR image processing method of claim 14, wherein each of m and n is 4, and the n subchannels are very long (VL), long (L), short (S), and very short (VS) channels.

16. The WDR image processing method of claim 14, wherein the generating of the integral histogram comprises:
dividing each of the m×n subchannels into a designated area comprising non-saturated pixels and a saturated area comprising saturated pixels;
setting an extraction area by setting a lower threshold luminance value and an upper threshold luminance value within the designated area;
counting a number of pixels included in the extraction area;
calculating a unit histogram for each of the m×n subchannels based on the counted number of pixels; and combining unit histograms calculated for the m×n subchannels.

17. The WDR image processing method of claim 14, wherein the reducing of the dynamic range of the WDR image comprises:
   calculating a knee curve based on the integral histogram and a number of saturated pixels included in each of the m×n subchannels; and
   transforming the integral histogram based on the knee curve.

18. The WDR image processing method of claim 17, wherein a slope for each interval of the knee curve is determined using a gamma curve.

19. The WDR image processing method of claim 17, wherein, when a first interval immediately preceding a second interval in the integral histogram has fewer pixels than the second interval, the second interval has a greater slope than the first interval in the knee curve.

* * * * *